(12) United States Patent
Suzuki et al.

(10) Patent No.: US 10,505,286 B2
(45) Date of Patent: Dec. 10, 2019

(54) SENSOR ELEMENT AND MANUFACTURING METHOD OF SENSOR ELEMENT

(71) Applicant: SHIBAURA ELECTRONICS CO., LTD., Saitama-shi, Saitama (JP)

(72) Inventors: Tatsuyuki Suzuki, Saitama (JP); Naoki Tsuneta, Aomori (JP); Ryohei Takada, Aomori (JP)

(73) Assignee: SHIBAURA ELECTRONICS CO., LTD., Saitama-Shi, Saitama (JP)

( * ) Notice: Subject to any disclaimer, the term of this patent is extended or adjusted under 35 U.S.C. 154(b) by 0 days.

(21) Appl. No.: 16/076,823

(22) PCT Filed: Mar. 24, 2017

(86) PCT No.: PCT/JP2017/012057
§ 371 (c)(1),
(2) Date: Aug. 9, 2018

(87) PCT Pub. No.: WO2018/173264
PCT Pub. Date: Sep. 27, 2018

(65) Prior Publication Data
US 2019/0267723 A1    Aug. 29, 2019

(51) Int. Cl.
*B23K 11/24*    (2006.01)
*G01K 7/22*    (2006.01)
(Continued)

(52) U.S. Cl.
CPC .......... *H01R 4/029* (2013.01); *B23K 11/0026* (2013.01); *B23K 11/166* (2013.01);
(Continued)

(58) Field of Classification Search
CPC ........ H01R 4/029; H01R 4/022; H01R 4/028; H01R 43/0214; H01R 43/28;
(Continued)

(56) References Cited

U.S. PATENT DOCUMENTS 8,591,104 B2 * 11/2013 Suzuki ................ B23K 26/127
374/163
8,702,305 B2 * 4/2014 Yokoi ...................... G01K 7/22
338/22 R
(Continued)

FOREIGN PATENT DOCUMENTS

JP    2010-176880 A    8/2010
JP    2013-068610 A    4/2013
(Continued)

OTHER PUBLICATIONS

International Search Report for International Application No. PCT/JP2017/012057, dated Jun. 13, 2017.

*Primary Examiner* — Andargie M Aychillhum
*Assistant Examiner* — Michael F McAllister
(74) *Attorney, Agent, or Firm* — Pearne & Gordon LLP

(57) ABSTRACT

A sensor element includes: an element body including, for example, a thermistor; paired lead wires drawn out from the element body; and stranded wires that are each obtained by twisting a plurality of core wires and are joined to the respective paired lead wires in a welding region. The welding region includes a main joining region provided in a predetermined region in an axis direction, and sub joining regions adjacent to the main joining region, and joining strength of each of the lead wires and the corresponding stranded wire is higher in the main joining region than in the sub-joining region.

19 Claims, 6 Drawing Sheets

(51) Int. Cl.
*H01R 43/28* (2006.01)
*H01R 4/02* (2006.01)
*B23K 11/00* (2006.01)
*B23K 11/16* (2006.01)
*B23K 11/34* (2006.01)
*H01R 43/02* (2006.01)
*B23K 101/32* (2006.01)
*B23K 101/38* (2006.01)

(52) U.S. Cl.
CPC ............... *B23K 11/34* (2013.01); *G01K 7/22* (2013.01); *H01R 4/022* (2013.01); *H01R 4/028* (2013.01); *H01R 43/0214* (2013.01); *H01R 43/28* (2013.01); *B23K 2101/32* (2018.08); *B23K 2101/38* (2018.08)

(58) Field of Classification Search
CPC ... B23K 11/0026; B23K 11/166; B23K 11/34; B23K 2101/32; B23K 2101/38; G01K 7/22
USPC ........................................................ 174/84 R
See application file for complete search history.

(56) References Cited

U.S. PATENT DOCUMENTS

| | | | |
|---|---|---|---|
| 9,207,130 B2* | 12/2015 | Mori | G01K 13/02 |
| 9,417,135 B2* | 8/2016 | Toudou | G01K 7/16 |
| 9,500,536 B2* | 11/2016 | Suzuki | G01K 7/22 |
| 9,752,936 B2* | 9/2017 | Nakanishi | G01K 1/08 |
| 2010/0064788 A1* | 3/2010 | Hofler | G01D 11/245 73/121 |
| 2011/0228812 A1* | 9/2011 | Suzuki | B23K 26/127 374/163 |
| 2013/0064266 A1* | 3/2013 | Mori | G01K 13/02 374/165 |
| 2014/0092940 A1* | 4/2014 | Suzuki | G01K 7/22 374/185 |
| 2015/0000395 A1* | 1/2015 | Tashiro | F02D 41/182 73/204.26 |
| 2015/0128681 A1* | 5/2015 | Stier | G01M 15/102 73/23.31 |
| 2015/0323392 A1 | 11/2015 | Mori | |

FOREIGN PATENT DOCUMENTS

| | | |
|---|---|---|
| JP | 2014-089176 A | 5/2014 |
| JP | 2015-232552 A | 12/2015 |
| JP | 2016-046070 A | 4/2016 |

* cited by examiner

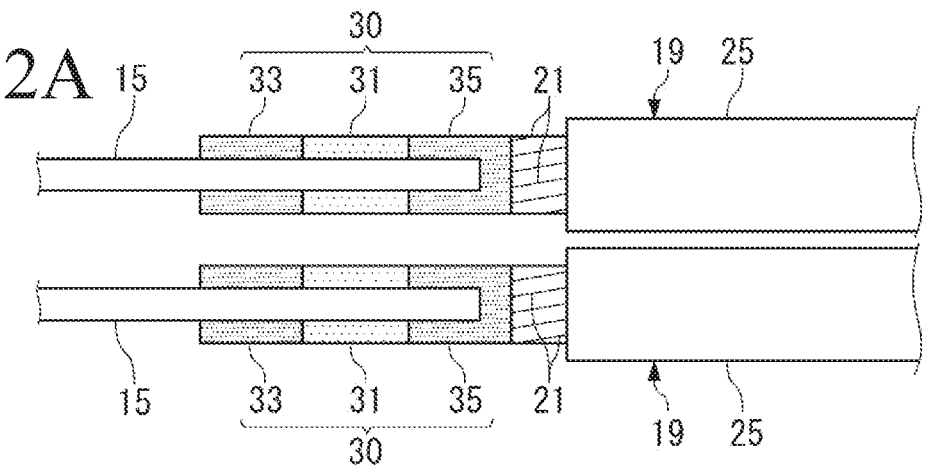
FIG. 2A
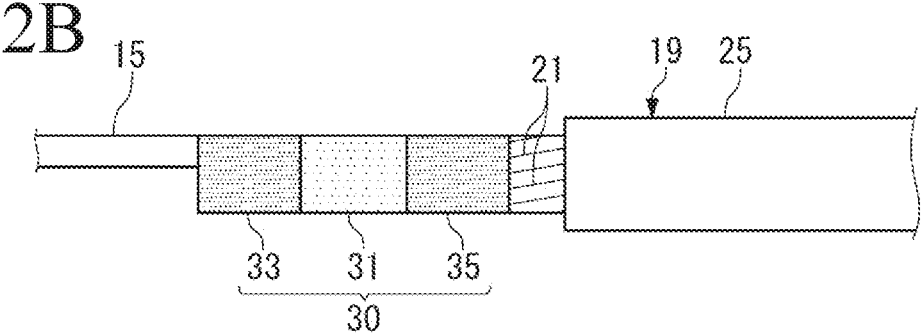
FIG. 2B
FIG. 2C
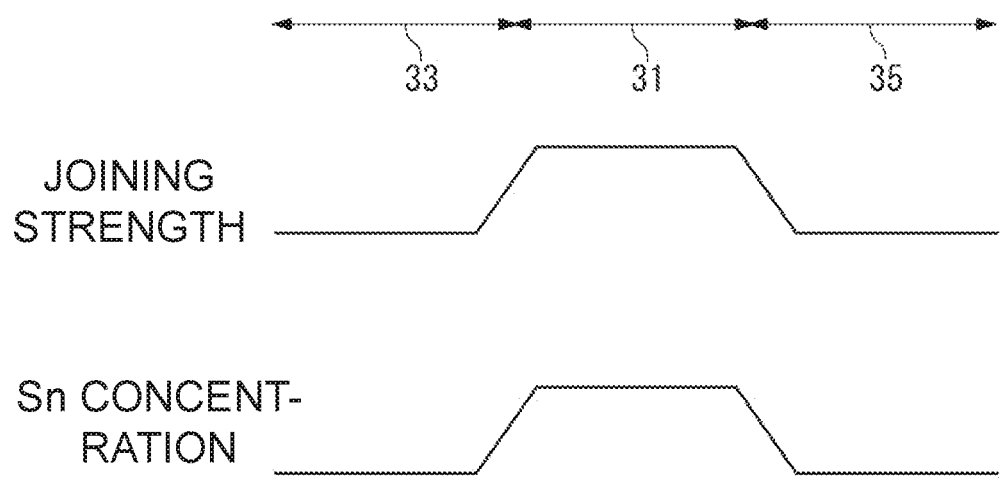

FIG. 4A
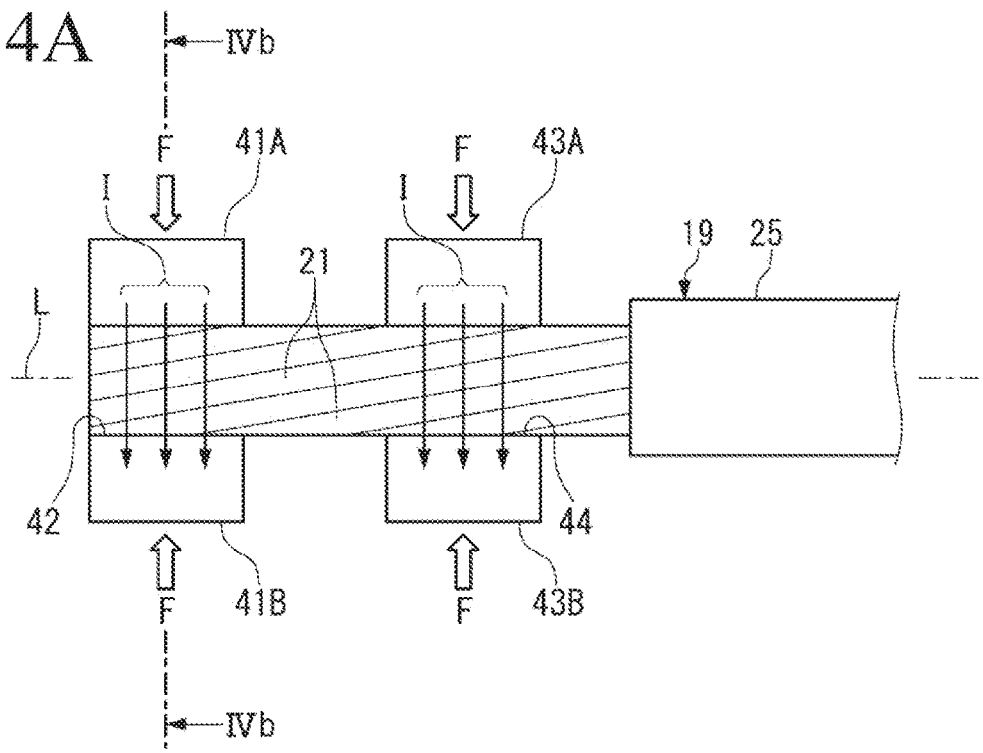
FIG. 4B
FIG. 4C
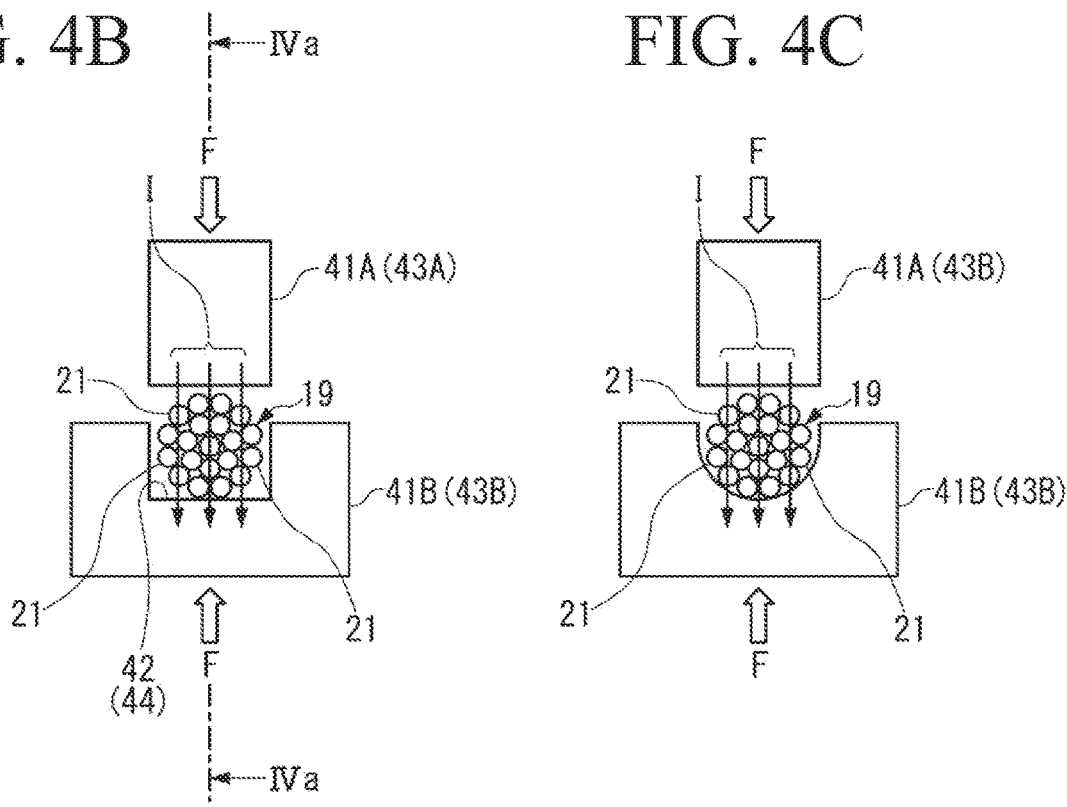

SENSOR ELEMENT AND MANUFACTURING METHOD OF SENSOR ELEMENT

CROSS-REFERENCE TO RELATED APPLICATIONS

This is a National Stage application of PCT international application PCT/JP2017/012057, filed on Mar. 24, 2017, which is incorporated herein by reference in its entirety.

TECHNICAL FIELD

The present invention relates to a sensor element in which a lead wire drawn out from, for example, a temperature-sensitive element and a conductive wire including a stranded wire are joined by welding.

BACKGROUND ART

Patent Literature 1 proposes integrating a plurality of core wires configuring a stranded wire by melting and welding through first resistance welding, and then lapping a lead wire and the stranded wire in an axis direction and joining the lead wire and the stranded wire through second resistance welding. According to Patent Literature 1, it is possible to easily and surely join the lead wire and the stranded wire.

Patent Literature 2 proposes a method of more easily and surely joining the lead wire and the stranded wire by welding. In the proposition, the stranded wire includes a first welded part in which the plurality of core wires is integrated by welding in the axis direction, the lead wire and the stranded wire are joined at a second welded part, and the second welded part is provided only at a position lapped with the first welded part in the axis direction.

CITATION LIST

Patent Literature

Patent Literature 1: JP 2013-68610 A
Patent Literature 2: JP 2015-232552 A

SUMMARY OF INVENTION

Technical Problem

The stranded wire typically includes a plurality of core wires made of copper or a copper alloy. Surfaces of the plurality of core wires are each plated with tin. Tin plating is applied in order to improve corrosion resistance of the core wires. When the first resistance welding is performed as disclosed in Patent Literature 1 and the first welded part is provided as disclosed in Patent Literature 2, however, tin configuring the plating is sublimated because tin has a low melting point of about 232° C. and heat exceeding the melting point of tin is applied to tin configuring the plating.

The tin plating is applied to provide corrosion resistance, and serves as an important role for welding of the lead wire and the stranded wire. In other words, tin is higher in electrical resistance than copper configuring each of the core wires. Accordingly, when the lead wire and the stranded wire are joined through resistance welding, a tin-plated part mainly generates heat by Joule heat to achieve welding. In contrast, copper is low in electrical resistance and is essentially unsuitable for resistance welding. Accordingly, when the welding is performed in two stages as disclosed in Patent Literatures 1 and 2, tin contributing to welding is lacked in the second welding, and high joining strength is not stably obtainable.

Accordingly, an object of the present invention is to provide a joining structure that stably achieves high joining strength in a sensor element in which the lead wire and the stranded wire are welded.

Solution to Problem

A sensor element according to the present invention includes: an element body; paired lead wires drawn out from the element body; and stranded wires that are each obtained by twisting a plurality of core wires, and are joined to the respective paired lead wires in a joining structure by welding.

The joining structure according to the present invention includes a main joining region provided in a predetermined region in an axis direction, and a sub-joining region adjacent to the main joining region, and joining strength of each of the lead wires and the corresponding stranded wire is higher in the main joining region than in the sub-joining region.

In the temperature sensor element according to the present invention, the sub-joining region may be provided on one or both of sides of the main joining region in the axis direction.

In the temperature sensor element according to the present invention, the sub-joining region may include a first sub-joining region and a second sub-joining region that are provided on both sides of the main joining region in the axis direction.

In the temperature sensor element according to the present invention, the first sub-joining region may be provided within a predetermined range from a front end of each of the stranded wires.

In the temperature sensor element according to the present invention, typically, each of the stranded wires preferably includes a plating layer made of tin on a surface of each of the core wires made of copper, and concentration of tin in the main joining region is preferably higher than concentration of tin in the sub-joining region.

In the temperature sensor element according to the present invention, each of the lead wires is typically made of copper.

In the temperature sensor element according to the present invention, each of the stranded wires preferably includes, in the joining structure, a front surface to which the corresponding lead wire is joined, and a rear surface opposite to the front surface, and the rear surface preferably includes an arc-shaped outer shape in cross-section.

Next, a manufacturing method of a sensor element according to the present invention is a method of manufacturing a sensor element that includes an element body, paired lead wires drawn out from the element body, and stranded wires that are each obtained by twisting a plurality of core wires and are joined to the respective paired lead wires by welding.

The manufacturing method according to the present invention includes a compacting step, an electrical wire installation step, and a joining step.

In the compacting step, pressurization and heating are performed on a predetermined region of each of the stranded wires in an axis direction to form a compacting region and to form a projection region that is adjacent to the compacting region and has a height relatively larger than a height of the compacting region.

In the electrical wire installation step, each of the lead wires and the corresponding stranded wire are lapped over the compacting region and the projection region.

In the joining step, pressurization and heating are performed to weld each of the lead wires and the corresponding stranded wire over the compacting region and the projection region.

In the compacting step according to the present invention, the core wires in the predetermined region are welded and are reduced in thickness to form the compacting region and the projection region.

Further, in the joining step according to the present invention, the projection region and the corresponding lead wire may be welded while the compacting region supports the corresponding lead wire.

In the manufacturing method of the sensor element according to the present invention, the joining strength of each of the lead wires and the corresponding stranded wire after the joining step may be made higher in the projection region than in the compacting region.

The compacting region according to the present invention may be provided on one or both of sides of the projection region in the axis direction.

Further, the compacting region may include a first compacting region and a second compacting region that are provided on both sides of the projection region in the axis direction. The first compacting region may be provided within a predetermined range from a front end of each of the stranded wires.

When each of the stranded wires that are used in the manufacturing method of the sensor element according to the present invention includes a plating layer made of tin on a surface of each of the core wires made of copper, concentration of tin in the projection region is preferably made higher than concentration of tin in the compacting region.

Each of the lead wires used in the manufacturing method of the sensor element according to the present invention is typically made of copper.

In the joining step according to the present invention, each of the stranded wires preferably includes a front surface to which the corresponding lead wire is joined, and a rear surface opposite to the front surface, and the rear surface is preferably applied to an electrode that includes an arc-shaped cross-section during the joining step.

Advantageous Effects of Invention

According to the sensor element of the present invention, the joining structure includes the main joining region and the sub-joining region, and the joining strength of each of the lead wires and the corresponding stranded wire is made higher in the main joining region than in the sub-joining region. In other words, according to the present invention, it is possible to provide the joining structure that stably achieves high joining strength by concentrating heat generation in a specific region of the joining structure by welding.

BRIEF DESCRIPTION OF DRAWINGS

FIGS. 2A to 2C are partial enlarged views each illustrating a welded part of the sensor element of FIG. 1, FIG. 2A being a plan view, FIG. 2B being a side view, and FIG. 2C being a graph illustrating characteristics of the welded part.

FIGS. 4A to 4C each illustrating a state where the stranded wire is compacted, FIG. 4A being a cross-sectional view taken along a line IVa-IVa of FIG. 4B, FIG. 4B being a cross-sectional view taken along a line IVb-IVb of FIG. 4A, and FIG. 4C being a cross-sectional view illustrating an example in which a shape of an electrode is changed from a shape of FIG. 4B.

DESCRIPTION OF EMBODIMENT

A sensor element 10 and a manufacturing method thereof according to an embodiment of the present invention are described below.

Figure 1A:
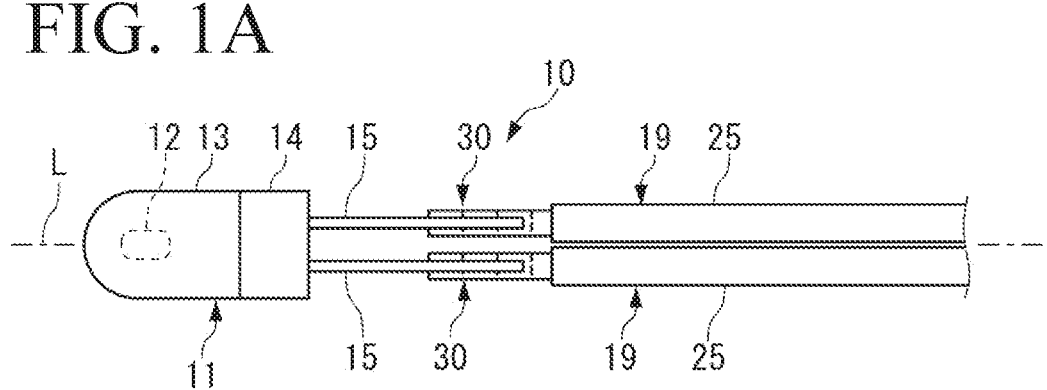
FIGS. 1A to 1D each illustrate a sensor element according to an embodiment, FIG. 1A being a plan view, FIG. 1B being a side view, FIG. 1C being a diagram illustrating a cross-sectional structure of a lead wire, and FIG. 1D being a diagram illustrating a cross-sectional structure of a core wire of a stranded wire.
Figure 1B:
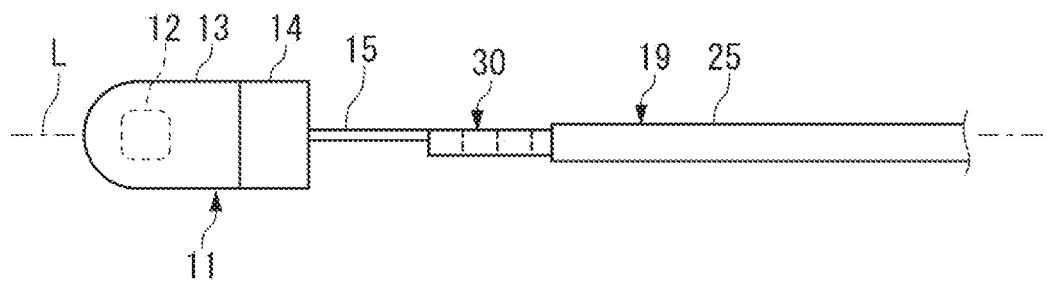

The sensor element 10 is used in a temperature sensor. As illustrated in FIGS. 1A and 1B, the sensor element 10 includes an element body 11, paired lead wires 15 and 15 drawn out from the element body 11, and stranded wires 19 and 19 that are joined to the respective paired lead wires 15 and 15. Electric resistance of the element body 11 is varied according to variation of ambient temperature. The sensor element 10 is characterized in that strength of a joining structure 30 of each of the lead wires 15 and the corresponding stranded wire 19 by welding is stably high.

[Configuration of Sensor Element 10]

As illustrated in FIGS. 1A and 1B, the element body 11 is a cylindrical member that includes a temperature-sensitive body 12 including temperature characteristics in electrical resistance, a sealing glass 13 covering surroundings of the temperature-sensitive body 12, and a ceramic protection tube 14 provided on rear end side of the sealing glass 13.

The temperature-sensitive body 12 includes a material having temperature characteristics in electrical resistance, for example, a thermistor.

The sealing glass 13 is provided to prevent chemical change and physical change based on an environment condition from occurring on the temperature-sensitive body 12 by sealing and maintaining the temperature-sensitive body 12 in an airtight state. Amorphous glass or crystalline glass may be used for the sealing glass 13, or amorphous glass and crystalline glass may be mixed so as to include a desired linear expansion coefficient and the mixture may be used for the sealing glass 13.

As illustrated in FIGS. 1A and 1B, the ceramic protection tube 14 is joined to a rear end part of the sealing glass 13 from which the lead wires 15 and 15 are drawn out, to mechanically reinforce the sealing glass 13, thereby improving electrical insulation property and mechanical strength.

The ceramic protection tube 14 is made of a sintered body with mechanical strength higher than the mechanical strength of the sealing glass 13, for example, alumina ($Al_2O_3$) or silicon nitride ($Si_3N_4$). The ceramic protection tube 14 includes unillustrated through holes into which the respective two lead wires 15 and 15 are inserted, along an axis direction L.

Note that the ceramic protection tube 14 is unnecessary for an application requiring low mechanical strength.

Figure 1C:
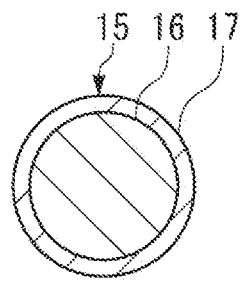

Each of the lead wires 15 drawn out from the element body 11 includes a Dumet wire. As illustrated in FIG. 1C, the Dumet wire includes an inner layer 16 and an outer layer 17 provided around the inner layer 16. The Dumet wire is a composite wire in which the inner layer 16 is made of an iron-nickel alloy having a thermal expansion coefficient close to a thermal expansion coefficient of glass, and copper or a copper alloy with high conductivity is cladded as the outer layer 17. Note that "made of copper" in the present invention includes a concept including copper and a copper alloy. Examples of the iron-nickel alloy include an iron-42 mass % nickel and iron-47 mass % nickel.

For example, each of the lead wires 15 includes a diameter of about 0.1 mm to about 1.0 mm.

As illustrated in FIG. 1 and FIG. 2, each of the stranded wires 19 includes a plurality of core wires 21 and an insulation coating 25 that is made of an electrical insulation resin material and covers the plurality of core wires 21.

Figure 1D:
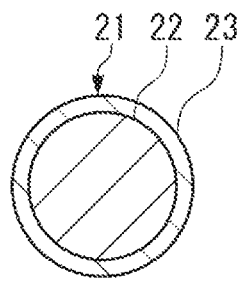

Each of the stranded wires 19 is a stranded wire including the plurality of core wires 21 that are twisted. Further, as illustrated in FIG. 1D, each of the core wires 21 includes a wire body 22 and a plating layer 23 covering the wire body 22. The wire body 22 is made of copper or a copper alloy with high conductivity, and the plating layer 23 is made of tin plating with corrosion resistance higher than corrosion resistance of each of the core wires 21. Tin configuring the plating layer 23 has the low melting point of about 232° C. as described above. Note that a composition of the tin plating is not limited, and includes a concept including tin and a tin alloy.

For example, the wire body 22 includes a diameter of about 0.5 mm to about 2.0 mm, and the plating layer 23 made of tin includes a thickness of about 0.5 μm to about 2.0 μm.

[Joining Structure 30]

Next, the joining structure 30 of each of the lead wires 15 and the corresponding stranded wire 19 by welding that is a feature of the sensor element 10 is described.

As illustrated in FIGS. 2A to 2C, the joining structure 30 includes, in order from front end side of the stranded wire 19, a first sub-joining region 33, a main joining region 31 adjacent to the first sub-joining region 33, and a second sub-joining region 35 adjacent to the main joining region 31. The first sub-joining region 33 and the second sub-joining region 35 are provided on both sides of the main joining region 31 in the axis direction L. A function of the main joining region 31 and a function of each of the first sub-joining region 33 and the second sub-joining region 35 are as follows.

In the joining structure 30, the lead wire 15 and the stranded wire 19 are joined by welding in the main joining region 31, the first sub-joining region 33, and the second sub-joining region 35. The main joining region 31 mainly provides the joining strength by welding.

The first sub-joining region 33 and the second sub-joining region 35 indirectly contribute to improvement of the joining strength of the main joining region 31; however, the joining strength of the first sub-joining region 33 and the second sub-joining region 35 themselves is lower than the joining strength of the main joining region 31. The first sub-joining region 33 and the second sub-joining region 35 support the lead wire 15 from both sides of the main joining region 31 when the lead wire 15 and the stranded wire 19 are welded, thereby preventing the lead wire 15 from sinking in between the plurality of core wires 21 and 21.

Regions respectively corresponding to the first sub-joining region 33 and the second sub-joining region 35 are subjected to compacting before a step of joining the lead wire 15 and the stranded wire 19 by welding. The compacting is one kind of welding and involves pressurization and heating. The core wires 21 and 21 adjacent to each other are melted and joined by the compacting, which makes it possible to prevent the lead wire 15 from sinking in between the core wires 21 and 21 during the welding even if the lead wire 15 is pressed against the stranded wire 19.

When the compacting is performed on the stranded wire 19, tin configuring the plating layer 23 of each of the core wires 21 located on a surface layer part of the stranded wire 19 is sublimated and at least partially disappears, which results in a part where the core wire 21 made of copper is exposed. In contrast, a region corresponding to the main joining region 31 between the first sub-joining region 33 and the second sub-joining region 35 is not subjected to the compacting, and the plating layer 23 on the surface of each of the core wires 21 accordingly remains as it is.

As described above, before the lead wire 15 and the stranded wire 19 are joined by welding, the plating layer 23 made of tin is present on the surface of each of the core wires 21 in the region corresponding to the main joining region 31, whereas tin disappears or little remains in the regions respectively corresponding to the first sub-joining region 33 and the second sub-joining region 35.

FIG. 2C illustrates joining strength of the lead wire 15 and the stranded wire 19 and concentration of tin (Sn concentration) configuring the plating layer 23 in the main joining region 31, the first sub-joining region 33, and the second sub-joining region 35. The joining strength relates to the concentration of tin. In other words, the main joining region 31 in which the concentration of tin is high is also high in joining strength.

[Joining Procedure]

The joining structure 30 is obtained by performing resistance welding of the lead wire 15 and the stranded wire 19 after the compacting is performed on the regions of the stranded wire 19 corresponding to the first sub-joining region 33 and the second sub-joining region 35.

A procedure to obtain the joining structure 30 is described below with reference to FIGS. 3A to 3D and FIGS. 4A to 4C.

[Compacting Step]

Figure 3A:
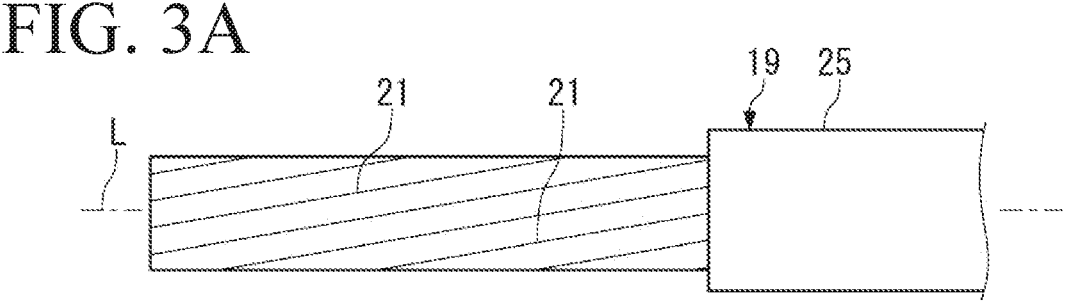
FIGS. 3A to 3D are side views illustrating a procedure of joining the lead wire and the stranded wire according to the present embodiment, FIG. 3A illustrating a single stranded wire before joining, FIG. 3B being a single stranded wire subjected to compacting, FIG. 3C illustrating the stranded wire subjected to the compacting and the lead wire before welding, and FIG. 3D illustrating the stranded wire and the lead wire after welding.
Figure 3B:
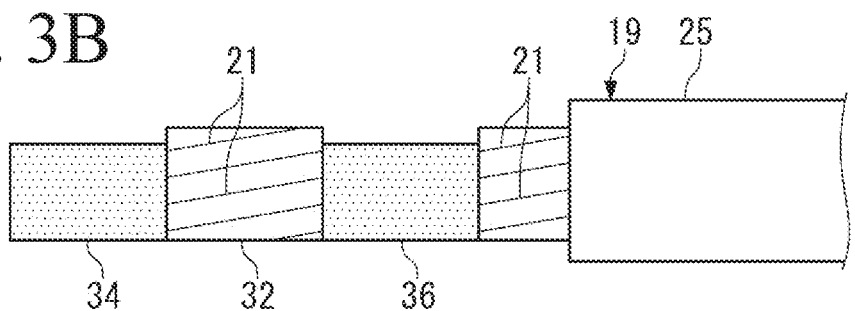

First, as illustrated in FIGS. 3A and 3B, the compacting is performed on the core wires 21 that are exposed from the insulation coating 25. The compacting is performed on a first compacting region 34 corresponding to the first sub-joining region 33 and a second compacting region 36 corresponding to the second sub-joining region 35. A compacting step is performed through resistance welding. A joining step is performed in a similar manner.

The compacting is a process of melting and joining the core wires 21 and 21 adjacent to each other by heating with pressurization. The plating layer 23 provided on the surface of each of the core wires 21 is melted. The first compacting region 34 and the second compacting region 36 both subjected to the compacting are reduced in dimension in a pressurization direction, namely, are reduced in thickness relative to other parts. Accordingly, a part not subjected to the pressurization and heating, sandwiched between the first compacting region 34 and the second compacting region 36 forms a projection region 32 that has a height relatively larger than a height of each of the first compacting region 34 and the second compacting region 36.

The first compacting region 34 is provided within a predetermined range from the front end of the stranded wire 19, and the second compacting region 36 is disposed symmetrically to the first compacting region 34 with the projection region 32 in between. The first compacting region 34 has a function of preventing the stranded wire 19 from being separated in subsequent steps.

As illustrated in FIGS. 4A and 4B, in the compacting, the first compacting region 34 is sandwiched by paired first upper electrode 41A and first lower electrode 41B, and the second compacting region 36 is sandwiched by paired second upper electrode 43A and second lower electrode 43B.

Note that the first upper electrode 41A and the second upper electrode 43A may be configured as an integrated upper electrode, and the first lower electrode 41B and the second lower electrode 43B may be configured as an integrated lower electrode.

The first upper electrode 41A, the first lower electrode 41B, the second upper electrode 43A, and the second lower electrode 43B are each made of, for example, an iron-based metal material that is a magnetic material.

The first upper electrode 41A and the second upper electrode 43A each include a flat surface pressurizing the stranded wire 19, and the first lower electrode 41B and the second lower electrode 43B respectively include accommodating grooves 42 and 44 in which the stranded wire 19 is disposed.

A current I is supplied between the first upper electrode 41A and the first lower electrode 41B and between the second upper electrode 43A and the second lower electrode 43B to generate Joule heat, and the plating layers 23 made of tin of the respective core wires 21 are particularly melted and welded by Joule heat. At this time, a load F to compress the first compacting region 34 is applied by the first upper electrode 41A and the first lower electrode 41B, and a load F to compress the second compacting region 36 is applied by the second upper electrode 43A and the second lower electrode 43B.

In the stranded wire 19 to be subjected to the compacting, the wire body 22 made of copper is smaller in electrical resistance by about one digit than the plating layer 23 made of tin. Accordingly, generation of Joule heat by the current I in the compacting is suppressed in the wire body 22 as a good conductor, whereas Joule heat is generated and welding is promoted in the plating layer 23 with large electrical resistance. In other words, the plating layer 23 with large electrical resistance mainly acts in the welding of the stranded wire 19. The plating layer 23 of each of the core wires 21 exposed on the surface layer of the stranded wire 19 is heated by Joule heat to temperature exceeding the melting point of about 232° C., for example, to about 600° C. to about 700° C. Therefore, the plating layer 23 disappears or little remains.

When the compacting is completed, the surface layer parts of each of the first compacting region 34 and the second compacting region 36 are each integrated because the core wires 21 adjacent to one another are joined by melting and solidification of the plating layers 23 made of tin. On the other hand, in the integrated surface layer parts in each of the first compacting region 34 and the second compacting region 36, the plating layer 23 mainly acting in the resistance welding disappears or little remains.

[Electrical Wire Installation Step and Joining Step]

Figure 3C:
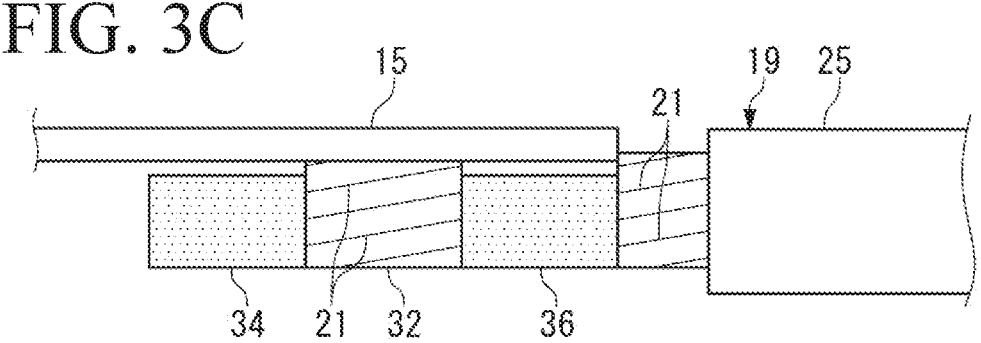

After the compacting step, the lead wire 15 is lapped on the stranded wire 19 as illustrated in FIG. 3C. At this time, the lead wire 15 is lapped on the stranded wire 19 over the projection region 32, the first compacting region 34, and the second compacting region 36.

Figure 5A:
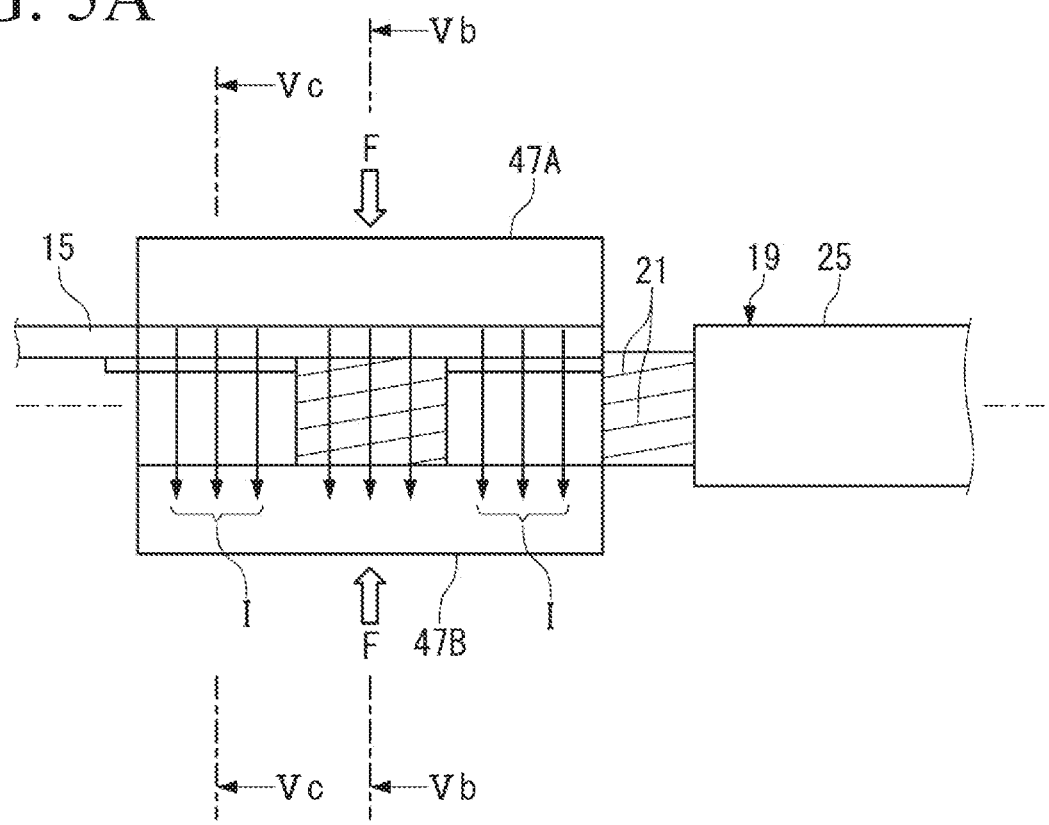
FIGS. 5A to 5C each illustrating a state where the lead wire and the stranded wire are joined by welding, FIG. 5A being a cross-sectional view taken along a line Va-Va of FIG. 5B, FIG. 5B being a cross-sectional view taken along a line Vb-Vb of FIG. 5A, and FIG. 5C being a cross-sectional view taken along a line Vc-Vc of FIG. 5A.
Figure 5B:
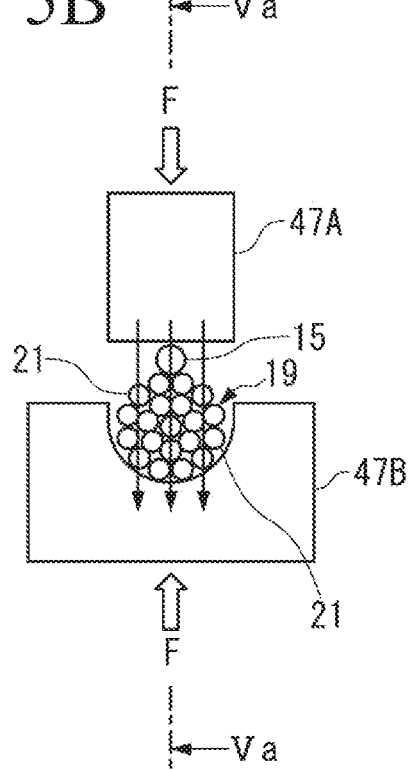

Next, as illustrated in FIGS. 5A and 5B, the whole of the projection region 32, the first compacting region 34, and the second compacting region 36 is sandwiched by paired upper electrode 47A and lower electrode 47B. At this time, the lead wire 15 mainly comes into contact with the projection region 32, and does not contact with the first compacting region 34 and the second compacting region 36 sandwiching the projection region 32, or contact with the first compacting region 34 and the second compacting region 36 with a minute area even if contacting the regions.

The current I is supplied between the upper electrode 47A and the lower electrode 47B to generate Joule heat, and the plating layers 23 of the respective core wires 21 are particularly melted and welded by Joule heat. At this time, the compression load F is applied to the lead wire 15 and the stranded wire 19 through the upper electrode 47A and the lower electrode 47B.

In an initial stage of welding of the lead wire 15 and the stranded wire 19, the lead wire 15 is in contact with the tall projection region 32 but is not in contact with the first compacting region 34 and the second compacting region 36, as illustrated in FIG. 3C. In other words, the welding is started while the lead wire 15 is in contact with a part of the range of the joining structure 30. In the resistance welding, temperature rise by Joule heat becomes large as a contacting area between welding objects is smaller. Accordingly, in the present embodiment, heat generation is concentrated between the lead wire 15 and the projection region 32. In addition, the plating layer 23 that is made of tin and mainly acts in the welding remains in the projection region 32, which further promotes the heat generation. The part welded in the above-described manner becomes the main joining region 31 with high joining strength.

The load F in the compression direction is applied between the lead wire 15 and the stranded wire 19. On the other hand, the individual core wires 21 in the projection region 32 are not integrated but independent at a time when the welding is started. Accordingly, the lead wire 15 to which the load F is applied tends to sink in between the core wires 21 and 21 adjacent to each other.

The first compacting region 34 and the second compacting region 36, however, are provided on both sides of the projection region 32 in the axis direction L. Accordingly, when the welding is progressed and the thickness of the projection region 32 is reduced, the lead wire 15 comes into contact with the first compacting region 34 and the second compacting region 36 where the surface layer parts have been integrated. As a result, the first compacting region 34 and the second compacting region 36 constrain the lead wire 15 from sinking in between the core wires 21 and 21 adjacent to each other in the projection region 32.

As described above, providing the first compacting region 34 and the second compacting region 36 allows the lead wire 15 and the stranded wire 19 to come into contact with each other in a stable attitude through the joining step by welding.

It was confirmed that the main joining region 31 includes a relatively coarse structure, and the first sub-joining region 33 and the second sub-joining region 35 each include a dense structure, in observation of cross-sectional surfaces of the main joining region 31, the first sub-joining region 33, and the second sub-joining region 35 after the joining step. In other words, the first sub-joining region 33 and the second sub-joining region 35 each include the dense structure because both regions are subjected to pressurization and heating twice through the compacting step and the joining step and the welding between the core wires 21 and 21 adjacent to each other is accordingly progressed.

[Effects]

The sensor element 10 including the above-described configuration achieves the following effects.

The sensor element 10 includes the main joining region 31, the first sub-joining region 33, and the second sub-joining region 35, and the main joining region 31 is a welded part where the heat generation is concentrated because the lead wire 15 contacts only the projection region 32 as a selected narrow region. In addition, since the plating layer 23 where the heat generation is promoted remains in the projection region 32, the heat generation is further promoted. Accordingly, the joining strength of the lead wire 15 and the stranded wire 19 including the main joining region 31 is high.

According to measurement by the present inventors, the joining structure according to the present embodiment makes it possible to achieve joining strength of about twice joining strength of a structure in which the lead wire 15 and the stranded wire 19 are welded without being subjected to compacting.

Further, in the sensor element 10, the first compacting region 34 and the second compacting region 36 provided on both sides of the projection region 32 in the axis direction L prevent the lead wire 15 from sinking in between the core wires 21 and 21 in the projection region 32. Accordingly, when a plurality of sensor elements 10 is manufactured, the attitude of the lead wire 15 to the stranded wire 19 in each of the sensor elements 10 is stabilized, which makes it possible to suppress variation of joining strength.

In particular, in the present embodiment, since the first compacting region 34 and the second compacting region 36 provided on both sides of the projection region 32 in the axis direction L support the lead wire 15, an effect of preventing sinking is large.

If the lead wire 15 is welded to the stranded wire 19 without performing compacting on the stranded wire 19, the load F is applied in association with the welding, and the lead wire 15 accordingly sinks in between the core wires 21 and 21. If the sinking state is constant, it is possible to suppress variation of joining strength; however, the lead wire 15 placed on the stranded wire 19 and the core wires 21 come into contact with each other in various ways. Accordingly, the sinking state is not constant. This causes variation of heat generation at the welded part and causes variation in joining strength.

Hereinbefore, although the preferred embodiment of the present invention has been described, the configurations described in the aforementioned embodiment may be selected or appropriately modified without departing from the scope of the present invention.

Figure 6A:
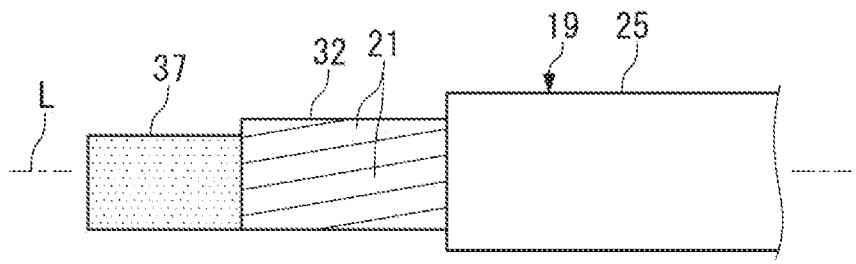
FIGS. 6A and 6B are diagrams each illustrating a modification of the present embodiment, FIG. 6A illustrating an example in which only front end side is compacted, and FIG. 6B illustrating an example in which only root side is compacted.
Figure 6B:
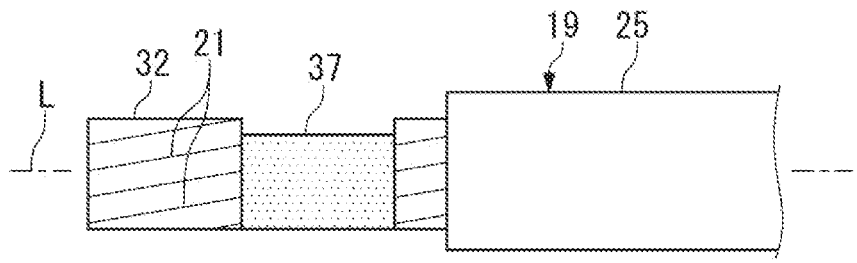

For example, in the present embodiment, the compacting is performed in the two regions separated in the axis direction L. Alternatively, as illustrated in FIGS. 6A and 6B, one compacting region 37 may be formed only on the front end side of the stranded wire 19, or one compacting region 37 may be formed only on root side of the stranded wire 19. It is possible to constrain the lead wire 15 from sinking in between the core wires 21 and 21 in the projection region 32 even by only one compacting region 37. This makes it possible to stably achieve high joining strength in the main joining region 31.

Further, the electrode used in the compacting step and the joining step may include an optional shape. For example, as illustrated in FIG. 4C, the accommodating groove 42 of the first lower electrode 41B may include an arc-shaped cross-section. When the electrode including the arc-shaped cross-section illustrated in FIG. 4C is applied to the stranded wire 19, the current I between the electrode and the stranded wire 19 easily becomes uniform. Accordingly, the heat generation of the stranded wire 19 also becomes uniform irrespective of a part of the electrode. In the case of the rectangular accommodating groove 42 illustrated in FIG. 4B, the current I between the electrode and the stranded wire 19 easily becomes nonuniform due to a corner of the accommodating groove 42. As a result, the stranded wire 19 may be welded to the electrode at a part where the current I is locally high. In contrast, when the current I flows uniform, the stranded wire 19 is hardly welded to the electrode.

Figure 5C:
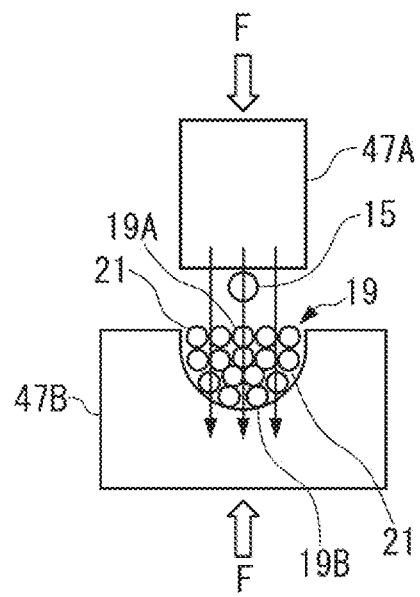

The stranded wire 19 compacted with use of the first lower electrode 41B illustrated in FIG. 4C includes the following cross-sectional structure because the accommodating groove 42 includes an arc shape. In other words, in FIG. 5C, the stranded wire 19 includes a front surface 19A to which the lead wire 15 is joined, and a rear surface 19B opposite to the front surface 19A, and an outer shape of the cross-section of the rear surface 19B is formed in an arc shape.

Further, the temperature-sensitive body including a thermistor has been described as an example of the sensor element used in the temperature sensor in the present embodiment; however, the present invention is applicable to various sensor elements in which the lead wire and the stranded wire are joined by welding, particularly, resistance welding.

Figure 3D:
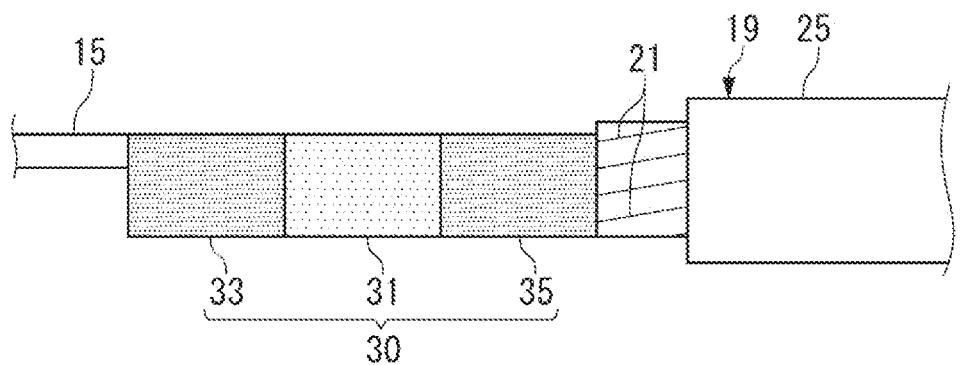

In the present embodiment, after the joining step is completed, the lead wire 15 is embedded inside the main joining region 31, the first sub-joining region 33, and the second sub-joining region 35 (joining structure 30) as illustrated in FIG. 2B and FIG. 3D, and the lead wire 15 is invisible from the side. The lead wire 15 is preferably embedded in terms of joining strength; however, the present invention is not limited to the structure, and the lead wire 15 may be protruded from the surface of the joining structure 30.

REFERENCE SIGNS LIST

10 Sensor element
11 Element body
12 Temperature-sensitive body
13 Sealing glass
14 Ceramic protection tube
15 Lead wire
16 Inner layer
17 Outer layer
19 Stranded wire
19A Front surface
19B Rear surface
21 Core wire
22 Wire body
23 Plating layer
25 Insulation coating
30 Joining structure
31 Main joining region
32 Projection region 33 First sub-joining region
34 First compacting region
35 Second sub-joining region
36 Second compacting region
41A First upper electrode
41B First lower electrode
42, 44 Accommodating groove
43A Second upper electrode
43B Second lower electrode
47A Upper electrode
47B Lower electrode
F Load
I Current
L Axis direction

What is claimed is:

1. A sensor element, comprising:
an element body;
paired lead wires drawn out from the element body; and
stranded wires that are each obtained by twisting a plurality of core wires and are joined to the respective paired lead wires in a joining structure by welding, wherein
the joining structure includes a main joining region provided in a predetermined region in an axis direction, and a sub-joining region adjacent to the main joining region, and
joining strength of each of the lead wires and the corresponding stranded wire is higher in the main joining region than in the sub-joining region.

2. The sensor element according to claim 1, wherein the sub-joining region is provided on one or both sides of the main joining region in the axis direction.

3. The sensor element according to claim 1, wherein the sub-joining region includes a first sub-joining region and a second sub-joining region that are provided on both sides of the main joining region in the axis direction.

4. The sensor element according to claim 3, wherein the first sub-joining region is provided within a predetermined range from a front end of each of the stranded wires.

5. The sensor element according to claim 1, wherein
each of the stranded wires includes a plating layer made of tin on a surface of each of the core wires made of copper, and
concentration of tin in the main joining region is higher than concentration of tin in the sub-joining region.

6. The sensor element according to claim 5, wherein each of the lead wires is made of copper.

7. The sensor element according to claim 1, wherein
each of the stranded wires includes, in the joining structure, a front surface to which the corresponding lead wire is joined, and a rear surface opposite to the front surface, and
the rear surface includes an arc-shaped outer shape in cross-section.

8. A manufacturing method of a sensor element, the sensor element including an element body, paired lead wires drawn out from the element body, and stranded wires that are each obtained by twisting a plurality of core wires and are joined to the respective paired lead wires by welding, the method comprising:
a compacting step of performing pressurization and heating on a predetermined region of each of the stranded wires in an axis direction to form a compacting region and to form a projection region that is adjacent to the compacting region and has a height relatively larger than a height of the compacting region;
an electrical wire installation step of lapping each of the lead wires and the corresponding stranded wire over the compacting region and the projection region; and
a joining step of performing pressurization and heating to weld each of the lead wires and the corresponding stranded wire over the compacting region and the projection region.

9. The manufacturing method of the sensor element according to claim 8, wherein, in the compacting step, the core wires in the predetermined region are welded and are reduced in thickness to form the compacting region and the projection region.

10. The manufacturing method of the sensor element according to claim 9, wherein, in the joining step, the projection region and the corresponding lead wire are welded while the compacting region supports the corresponding lead wire.

11. The manufacturing method of the sensor element according to claim 8, wherein the joining strength of each of the lead wires and the corresponding stranded wire after the joining step is higher in the projection region than in the compacting region.

12. The manufacturing method of the sensor element according to claim 8, wherein the compacting region is provided on one or both of sides of the projection region in the axis direction.

13. The manufacturing method of the sensor element according to claim 8, wherein the compacting region includes a first compacting region and a second compacting region that are provided on both sides of the projection region in the axis direction.

14. The manufacturing method of the sensor element according to claim 13, wherein the first compacting region is provided within a predetermined range from a front end of each of the stranded wires.

15. The manufacturing method of the sensor element according to claim 8, wherein
each of the stranded wires includes a plating layer made of tin on a surface of each of the core wires made of copper, and
concentration of tin in the projection region is higher than concentration of tin in the compacting region.

16. The manufacturing method of the sensor element according to claim 15, wherein each of the lead wires is made of copper.

17. The manufacturing method of the sensor element according to claim 8, wherein
each of the stranded wires includes a front surface to which the corresponding lead wire is joined, and a rear surface opposite to the front surface, and
the rear surface is applied to an electrode that includes an arc-shaped cross-section in the joining step.

18. The sensor element according to claim 2, wherein
each of the stranded wires includes a plating layer made of tin on a surface of each of the core wires made of copper, and
concentration of tin in the main joining region is higher than concentration of tin in the sub-joining region.

19. The sensor element according to claim 1, wherein concentration of tin in the main joining region is higher than concentration of tin in the sub-joining region.

* * * * *